United States Patent [19]
Castaldi

[11] Patent Number: 5,810,540
[45] Date of Patent: Sep. 22, 1998

[54] AUTOMATED STORAGE AND RETRIEVAL SYSTEM AND BIN INSERTION/EXTRACTION MECHANISM THEREFOR

[76] Inventor: John Castaldi, 785 Carrol St., Brooklyn, N.Y. 11215

[21] Appl. No.: 640,328

[22] Filed: Apr. 30, 1996

[51] Int. Cl.⁶ ............................................ B65G 1/04
[52] U.S. Cl. ............................................... 414/280
[58] Field of Search .................... 414/268, 277, 414/280, 661

[56] References Cited

U.S. PATENT DOCUMENTS

| | | | |
|---|---|---|---|
| 2,646,177 | 7/1953 | Nussbaum et al. | 414/280 |
| 3,598,265 | 8/1971 | Aaronson | 414/661 |
| 4,007,846 | 2/1977 | Pipes | 414/280 X |
| 4,010,856 | 3/1977 | Anderson | 414/280 X |
| 4,358,239 | 11/1982 | Dechantsreiter | 414/661 |
| 4,417,838 | 11/1983 | Schultz et al. | 414/277 |
| 4,690,602 | 9/1987 | Castaldi et al. | 414/280 X |
| 4,856,956 | 8/1989 | Zur | 414/280 |
| 5,203,661 | 4/1993 | Tanita et al. | 414/280 X |
| 5,213,463 | 5/1993 | Rothlisberger et al. | 414/280 |
| 5,328,316 | 7/1994 | Hofmann | 414/280 |

*Primary Examiner*—James W. Keenan
*Attorney, Agent, or Firm*—Mitchell A. Stein; Stein & Associates, P.C.

[57] ABSTRACT

A storage and retrieval system includes sat least two pairs of two confrontingly opposed, columnar arrays. Each of the pairs of columnar arrays defines a plurality of vertically spaced tray-receiving recesses. One or more platforms are provided, each vertically displaceable along and between each of the pairs of arrays. Each platform carries an extraction device operable for withdrawing a selected tray from an array recess onto the platform, and for inserting a tray supported on the platform into a vacant recess in either array. The extraction device includes a retractable/extendable pin mounted in a housing configured in a manner to provide engagement with an aperture on a side face of one of the bins to create a bin-engaged state when engaged and a bin-disengaged state when disengaged. Each device has an extended cam-follower portion that rides in a cam. As the endless chains travel in a chain pattern, the extractor assembly is driven along the chain pattern and the extended cam-follower portion cammingly engages the cam, in a manner such that the retractable/extendable pin is caused to move linearly in a pin plane orthogonal to a chain plane (created by the chain pattern) between a retracted and extended position, thereby moving from the bin-engaged state in the extended position to a bin-disengaged state in the retracted position. The pins releasably engage, through rotation of the chains and action of the cam, into apertures in the bins. As a consequence of the configuration, bins or trays can be stacked more tightly in the vertical direction. The insertion/extraction device can be used in many different types of automated storage and retrieval systems. Also provided is tandem operation of two platforms using a single control system.

12 Claims, 14 Drawing Sheets

AUTOMATED STORAGE AND RETRIEVAL SYSTEM AND BIN INSERTION/ EXTRACTION MECHANISM THEREFOR

FIELD OF THE INVENTION

The present invention relates to automated article storage and retrieval systems in which articles are stored in bins or trays located within and along arrays of such trays, the trays are vertically spaced apart within recesses defined along a pair of confrontingly opposed columnar arrays separated by an access region within which a platform is vertically displaceable into registration with such array-supported trays or tray positions. More particularly, the invention is directed to a system having two such pairs of columnar arrays, each having a platform, such that the two platforms move in tandem, and wherein the trays are selectively withdrawn from and inserted into the arrays by an insertion/extraction mechanism carried on each movable platform. The insertion/extraction mechanism is also suitable for a single pair of columnar arrays. The mechanism is generally also suitable for other, large scale systems in which bins are stored in arrays, including multiple confrontingly opposed columns in which the movable platform moves not only in upward and downwards registration between two such opposed columns, but also in frontwards to backwards motion along a rail or other supporting member between groups of such confrontingly opposed columns.

BACKGROUND OF THE INVENTION

Warehousing of articles has long been sought in order to achieve efficient use of space and inventory control. Many automated storage and retrieval systems provide high density storage with ready access to the stored articles. For example, commonly-invented U.S. Pat. No. 4,690,602 discloses a two-dimensional array of storage bins which are extractable for accessing stored articles by an extractor that moves down a center aisle between opposing arrays, locates the proper column of the array, moves upwardly or downwardly with respect to the column, and aligns with a proper bin location for extraction of a bin. The bin is thereafter extracted onto a platform, the platform with the bin carried thereupon is traversed to the front of the aisle, and the bin is presented for access to the articles stored therein.

In the '602 patent, a two-dimensionally displaceable platform is required to first traverse the aisle without interference with the bins, and then to extend arm-like extractor elements into the storage location past the front edge of a bin for engagement with the sides of the bin thereby providing withdrawal of the bin from the array, and similar reinsertion of the bin into the same or a different storage location.

Such multi-columnar arrays, while viable for the storage of a multiplicity of articles in light of the many locations for insertion and extraction of bins, create issues of complexity relative to the need for two-dimensional movement of the platform, and are thus typically not economically justifiable for smaller storage requirements.

Thus, the industry also includes single, stand-alone units having a pair of confrontingly opposed columns for storage of bins, and a single platform that traverses the accessible region between the two columns. In such arrangements, the platform need only move in the single dimension in the accessible region, by moving upwardly and downwardly. In such instances, extraction of bins from their respective locations in the columnar arrays is typically accomplished by either the use of fingers mounted to a single chain that catch a lip or extension mounted on the front of the bin (and back of the bin, respectively to allow full support and delivery), or by the use of opposing bars that are chain driven to catch such lips, as disclosed in commonly-invented U.S. Pat. No. 5,199,840. Since the platform for carrying the insertion/extraction mechanism in such stand-alone systems does not traverse a distance between multiple arrays, such a system does not typically include an ability to extend the mechanism into alignment, and to retract the mechanism to allow such additional traversal.

Insertion/extraction mechanism found in the prior art, whether for large systems or stand-alone systems, typically employ fingers or bars that travel rotationally about a sprocket in order to extend into alignment with the lip or extension of the bin sought to be remove. Thus, the primary path of motion into alignment is rotational until the finger or bar is engaged. In these instances, sufficient distance must be created between vertically displaced bins such that the finger or bar, as it moves rotationally into alignment with the lip or extension of the bin to be extracted, does not collide with the bin positioned above or below. Thus the distance between bins in such arrangement is related to the radius of the circle traversed by the finger or pin about the sprocket that drives the finger or pin into alignment. Moreover, the same sprocket (with chain) assembly is both the driving force for engagement with the lip or extension, as well as for moving the finger or pin as the bin is extracted or inserted.

FIGS. 14(a), 14(b) and 14(c) show diagrammatically the prior art insertion/extraction mechanisms. In particular, FIG. 14(a) shows a typical system employed by a "miniload" or other large scale device for accessing bins that are stored in three dimensional arrays. Two pairs of endless chains 206 are driven about sprockets 204. It should be observed that the path of motion for engagement of the bin as well as moving of the bin is in the same plane, and in this instance is parallel to the plane of the bottom of the bin. Direction of motion is shown by the arrows in this figure. In this manner, bin pullers 202 are first driven into the finger or extension 210 for engagement, and then as pullers 202 continue to travel about sprocket 204, bin pushers 212 are forced into alignment at the rear of bin 208, thereby fully holding bin 208 in both its front (by pullers 202) and rear (by pushers 212). The bin must be surrounded on all four corners to achieve cross-overs or left-right insertion, such a bin may be moved to a right column or a left column (with respect to the platform therebetween). In arrangement in which cross-overs are not desired, only one set of either pullers 202 or pushers 212 are employed, but such situations are atypical.

FIG. 14(b) shows another prior art insertion/extraction mechanism typically employed for single, stand-alone systems, since the mechanism would, in typical configurations, collide with other bins, if such bins were stored in columns next and in addition to the two that are confrontingly opposed with the platform in between. In this mechanism, pins or bars 216 are carried by two drive chains 218 and 220 which are, in turn, driven by sprockets 204 (4 in total, at each of the four corners). It should be observed that, in this configuration, the chains are not within the plane of the bins, but rather are in planes that are orthogonal to the planes of the bins. The pins or bars 214, 216 still traverse the circumference of the sprockets about which the chains 218 and 220 travel, and thus the bin directly above or below bin 208 must be at a distance to accommodate this traversal. Like the miniload example shown in FIG. 14(a), in FIG. 14(b) a first set of pins or bars 214 enable first engagement with the front of the bin, and a second set of pins or bars 216 enable second engagement with the rear of the bin to allow for cross-overs. As shown with greater particularity in FIG.

14(c), first pins or bars 214 engage the lip or extension 210 as they traverse about sprocket 204.

Thus, in typical automated storage and retrieval systems, some space, the very commodity sought to be saved, is lost in part as a consequence of the requirement that space between bins in the columnar arrays be sufficient to ensure that the insertion/extraction mechanism does not improperly interact with an adjacent bin as the assembly traverses into engagement.

It is thus an object of the instant invention to provide an insertion/extraction mechanism for use in large systems as well as single, stand-alone systems that allows more tight packing of bins one against the other, while providing positive engagement of the bins.

SUMMARY OF THE INVENTION

The foregoing and other objects are achieved by the instant invention which involves storage and retrieval systems that include at least a pair of two confrontingly opposed, columnar arrays. Each of the columnar arrays defines a plurality of vertically spaced tray-receiving recesses. At least one platform is provided, vertically displaceable along and between a pair of arrays. Each platform carries an extraction device operable for withdrawing a selected tray from an array recess onto the platform, and for inserting a tray supported on the platform into a vacant recess in either array.

The extraction device includes a retractable/extendable pin mounted in a housing configured in a manner to provide engagement with an aperture on a side face of one of the bins to create a bin-engaged state when engaged and a bin-disengaged state when disengaged. Each device has an extension portion that rides in a cam. As the endless chains travel in a chain pattern, the extractor assembly is driven along the chain pattern and the extension portion camingly engages the cam, in a manner such that the retractable/extendable pin is caused to move linearly in a pin plane orthogonal to a chain plane (created by the chain pattern) between a retracted and extended position, thereby moving from the bin-engaged state in the extended position to a bin-disengaged state in the retracted position. The pins releasably engage, through rotation of the chains and action of the cam, into apertures in the bins. As a consequence of the configuration, bins or trays can be stacked more tightly in the vertical direction. The insertion/extraction device can be used in many different types of automated storage and retrieval systems. Also provided is tandem operation of two platforms using a single control system.

The double finger or bar insertion/extraction mechanism of the prior art, or the rotating chains that reside in the same plane as the bin, requires that a bar or finger traverse the circumference of the sprocket as it enters into a lip or handle on a bin. In order to maximize the use of space an alternative technique disclosed and claimed herein involves the use of extraction pins that are urged to move by action of a cam.

In this manner, the pin does not pivot into engagement as in the prior art. Instead, it is directed outwardly into apertures in the pans as the chains are driven along in their primary direction. It should be appreciated that the linear direction of motion of the pins, while coordinated with the elliptical, rotational motion of the chains, renders these directions substantially orthogonal. In prior devices, however, the single motion of the chains also moves the pins into alignment. In the present invention, two separate and distinct activities occur: movement of the chains, and movement of the pins by action of a cam. This is described in greater detail in the drawings and below.

As a consequence, the distance between the engagement means, carried on a platform, and the bins can be reduced in comparison to that shown in the prior art. Likewise, the space between bins can be reduced.

Also shown is a dual load system having two pairs of opposing columns, and two platforms. Each platform traverses the distance between each of the opposing columns. The platforms are organized in tandem in order to avoid the use of multiple control and drive systems to move the platform. This counterweight mechanism involves the use of cables to raise and lower the platforms. The cables are run through pulleys in a manner to prevent interference with the motion of the platforms. These cables can also be helically coiled about a single drum, and the drum driven by a single motor.

The insertion/extraction mechanism of the instant invention provides for less space, while still enabling the provision of heavy loads in the bins. The entire two pair, two chain arrangement is driven by a single motor, and thus only a single motor control is required.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein similar reference characters denote similar elements through the several views.

DETAILED DESCRIPTION OF THE PREFERRED EMBODIMENTS

The present invention relates to an automated article storage and retrieval system and, in a currently preferred form of the invention, to a vertically-oriented arrangement having two pairs of confrontingly opposed or facing arrays (or towers, columns or rack) in each of which a plurality of vertically-spaced tray (or bin) locations are defined. In the recesses defined by the space between each opposing pair of columns, a platform moves upwardly and downwardly. An extraction device is carried on the platform for engaging a selected tray (or bin), and displacing that tray horizontally upon the platform, such that the tray can be delivered to a receiving section of the column or transported via the platform to another location in the rack. Novelty is primarily imparted by way of the mechanism for engagement and horizontal displacement of the selected tray or bin.

With specific reference to the drawings, an overall side view of an automated storage and retrieval system constructed in accordance with the invention is shown in FIGS. 1 through 4, while the insertion/extraction device and its motion are shown in FIGS. 5 through 13, and a comparison with prior techniques is shown in FIG. 14.

Figure 1:
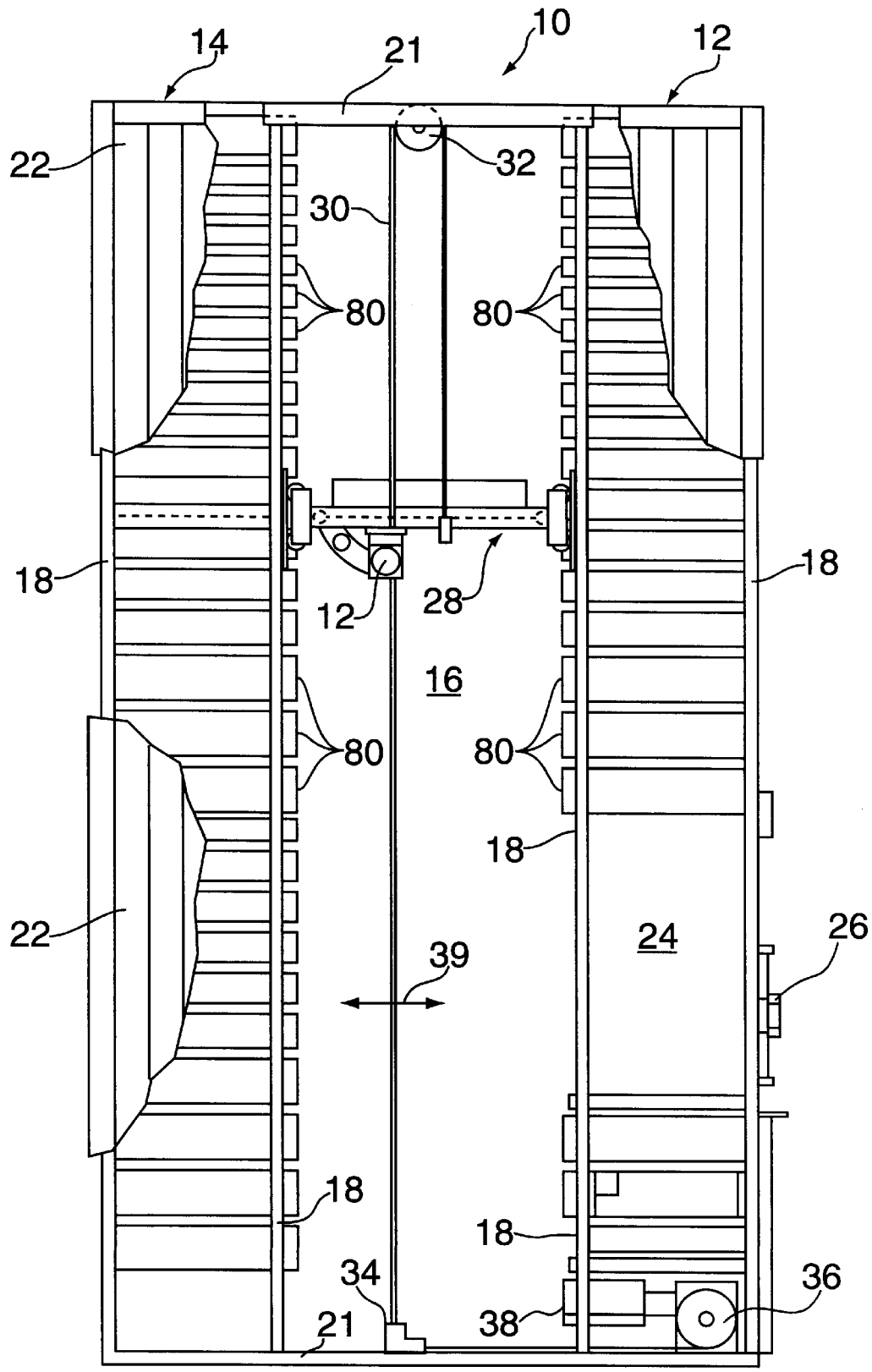
FIG. 1 is a side view, partly in cross section, of an automated storage and retrieval system showing certain of the components visible from the perspective, in accordance with the present invention.

In FIGS. 1 through 4, system 10 is comprised of four vertically-oriented columnar arrays 12, 13, 14, 15. FIG. 1 shows a side view perspective wherein only arrays 12 and 14 are visible. Each of arrays 12 and 14, on the one hand, and arrays 13 and 15 on the other, constitute a pair of confrontingly opposed arrays which face one another and are separated apart by a predetermined distance or separation to delineate an access region 16 with respect to arrays 12 and 14, and 17 with respect to arrays 13 and 15, as shown more clearly in FIG. 2. Each of the arrays may, by way of example, be fabricated as a framework of vertical masts 18 and generally horizontal crossbars 20 (see FIG. 2), the crossbars defining a plurality of tray-receiving locations or recesses or shelves in each array for receiving trays. Top and bottom bracing members 21 may also spanningly connect the opposed arrays 12 and 14, and 13 and 15 for enhanced stability. In system 10, crossbars 20 can be adjustable for selectively varying the locations of and vertical spacing between all or particular ones of the tray-receiving locations, to allow for different sized trays. System 10 may also be suitably enclosed or enveloped by an outer skin or sheeting 22 so as to limit unintended access to articles stored there within and to prevent inadvertent worker injury from moving parts. An operator workstation or article delivery area 24 is implemented by providing an enlarged opening in on location in the array by a corresponding vertical separation between appropriately positioned horizontal crossbars or shelf members 20 at the top and bottom of the workstation. A user interface 26 is provided in order to allow the user to input commands for extraction and delivery, or relocation, of particular bins in the arrays.

Figure 3:
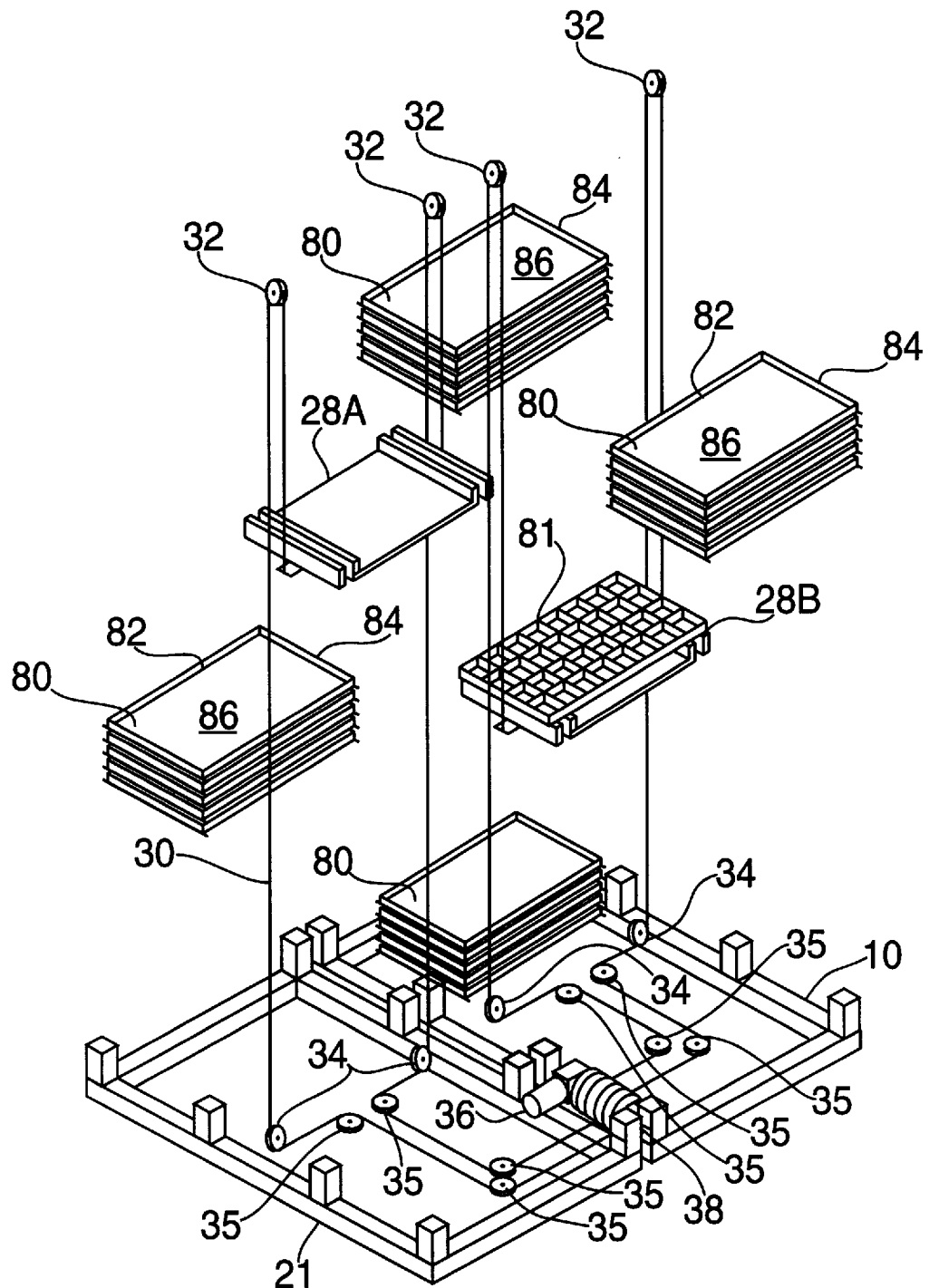
FIG. 3 is a representative three-dimensional perspective view of some bins as they would be placed in the array shown in FIG. 2, with one bin positioned on one of the platforms, together with a cabling run utilizing helical wraps about a single drum, in accordance with the embodiment of the present invention shown in FIG. 2.

The trays 80 which are receivable in the horizontal crossbar-defining locations or shelves of each array 12, 13, 14, 15 may be fabricated as bins for direct receipt of stored parts or articles. In this manner, the trays may be compartmentalized or otherwise selectively capable of such compartmentalization or segmentation. Alternatively, the trays may be designed as carriers for replaceable or reconfigurable inserts within which such parts or articles are carried. In an embodiment of the present invention, each tray 80 comprises a generally rectangular, centrally-open frame within which an article bin is supportedly carriable and comprised of unitarily formed or otherwise rigidly attached side members 82 and end members 84 (see FIG. 3). Each of the side and end members 82, 84 is configured, as with an L-shaped cross section, to provide a respective bin-supporting horizontal base 86. When a tray 80 is disposed within one of the available array locations or recesses, the tray is supported either on its side or bottom, as the case may be, by the crossbars or shelf members 20, and thereby support is provided for the tray within the recess and as the tray is slidably withdrawn therefrom or inserted thereto, along line 39. By way of example, as shown in FIG. 3, a selected bin 81 is positioned upon platform 28B. Bin 81 comprised a plurality of compartments for receiving articles.

Figure 2:
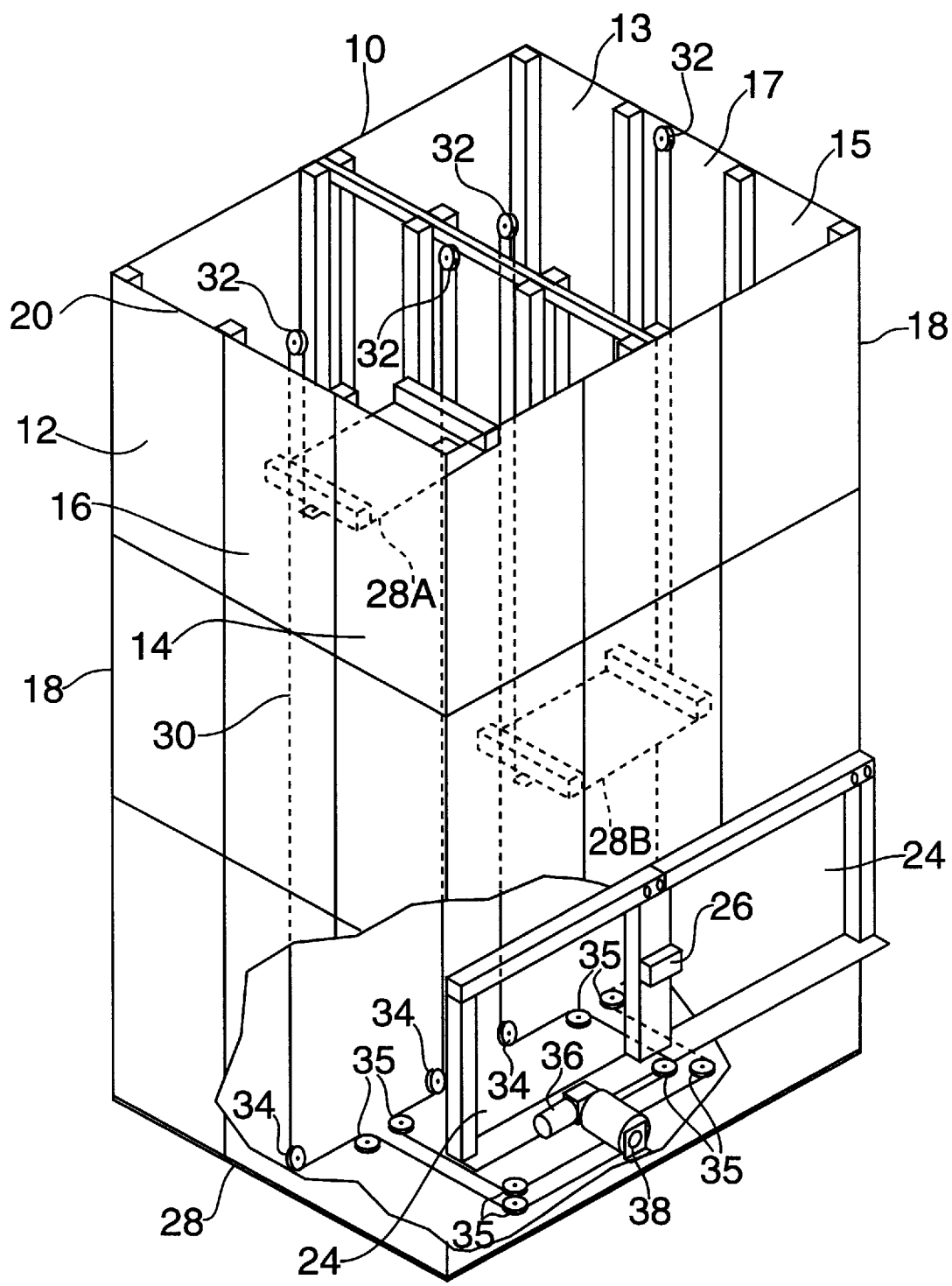
FIG. 2 is a perspective view, partly broken away, showing a dual rack structure in which bins are stored in two pairs of opposing columnar arrays with a recess between each column in each of the pairs wherein a platform is suspended by cabling in a manner that provides for tandem motion of the two platforms, in accordance with an embodiment of the present invention.
Figure 4:
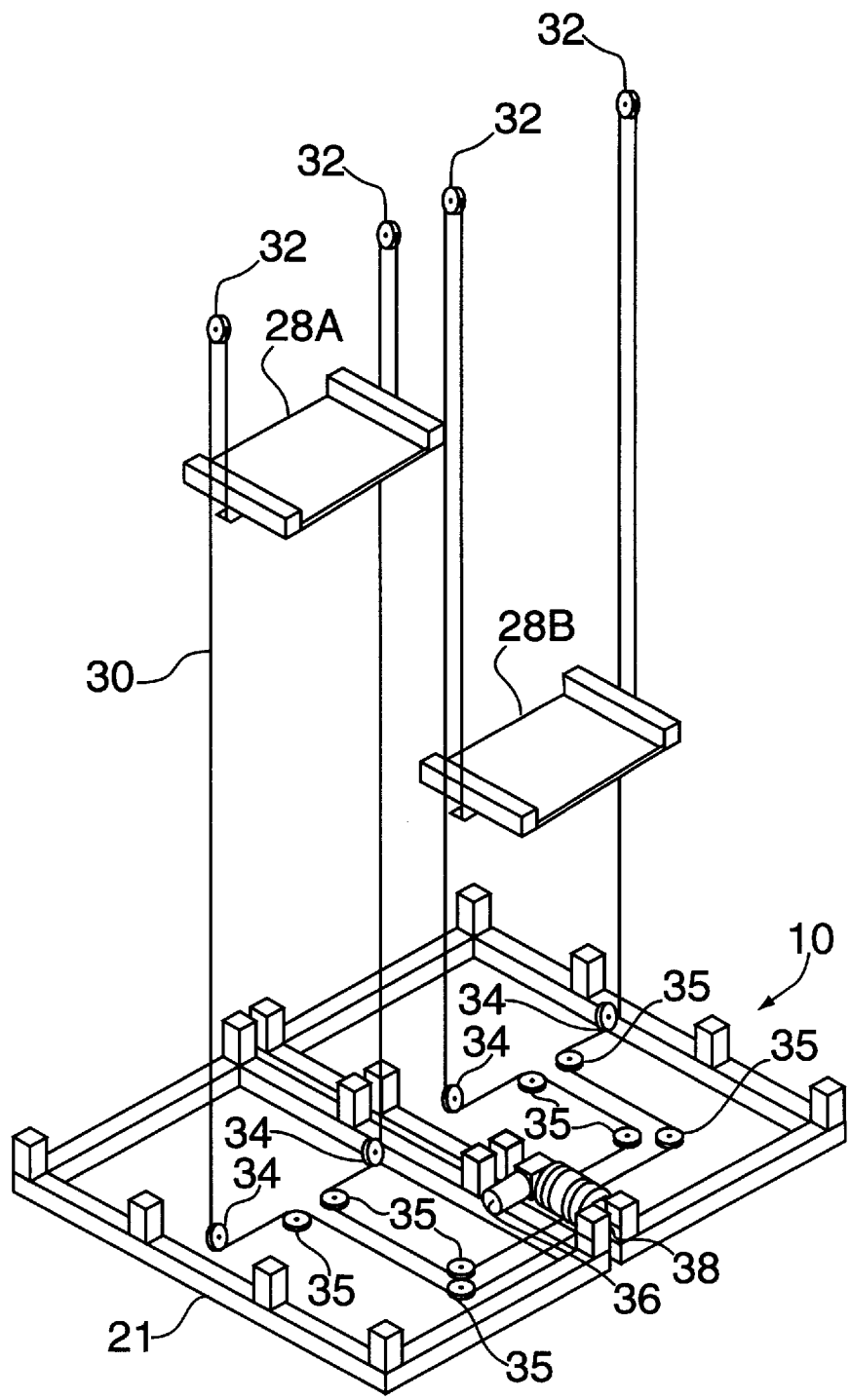
FIG. 4 is a representative three-dimensional perspective view of the embodiment shown in FIGS. 2 and 3, without bins and the rack assembly shown.

As shown in FIGS. 2 through 4, each platform 28 (A and B) is adapted for single-dimensional vertical movement along and between the opposed first and second arrays 12 and 14 and 13 and 15, respectively. For this purpose, a lift cable 30 is secured to the platform 28 and is led, as through top and bottom pulleys 32, 34 and through additional bottom pulleys 35 to a feed drum 36 about which the lift cable is selectively wound and unwound for respectively raising and lowering each platform. In the embodiment shown in FIGS. 2 through 4, cable 30 is helically wound about drum 36, such that the platform 28 A and 28B move in tandem. In other words, as, for example, platform 28 A moves in the upward direction, 28 B moves in the downward direction. In this manner, an operator accessing bins at article delivery area 24 can pick articles from a bin delivered by platform 28 A, and move to the immediately proximate receiving area for picking from a bin after it is subsequently delivered by platform 28 B. In this manner, a single helical drum 36 can be utilized to provide platform movement for each of the two separate pairs of arrays 12 and 14, on the one hand, and 13 and 15 on the other. The feed drum 36 is, in turn rotated by and under the control of an electric, bidirectionally-operable motor 38 located, in the illustrated embodiment, at or proximate to the location wherein the two sets of array 12 and 14, on the one hand, and 13 and 15 on the other meet. It should be appreciated that the cable run configuration may be altered, however, in the illustrated embodiment, cable 32 cannot interfere with the single-dimensional movement of the platforms 28 (A and B), and, as well, must properly engage the drum 38 in order to avoid counter windings.

It should be appreciated that the arrays, tray receiving locations and bins are shown only in partial view in FIGS. 2 through 4 in order to show more clearly the platform 28(A and B) motion and cable configuration.

Also carried on each platform 28 is a tray extraction device 110, the main operating components of which are perhaps best seen in FIGS. 5 through 13. It should initially be appreciated that while the tray extraction device 110 is shown herein in connection with a dual automated storage and retrieval system (i.e., having two platforms and two separate confrontingly-opposed arrays), the device 110 can also be used in a single, stand-alone configuration. Likewise, the tray extraction device is well suited for many other configurations, including the miniload, where multiple arrays of storage locations are provided.

Figure 5:
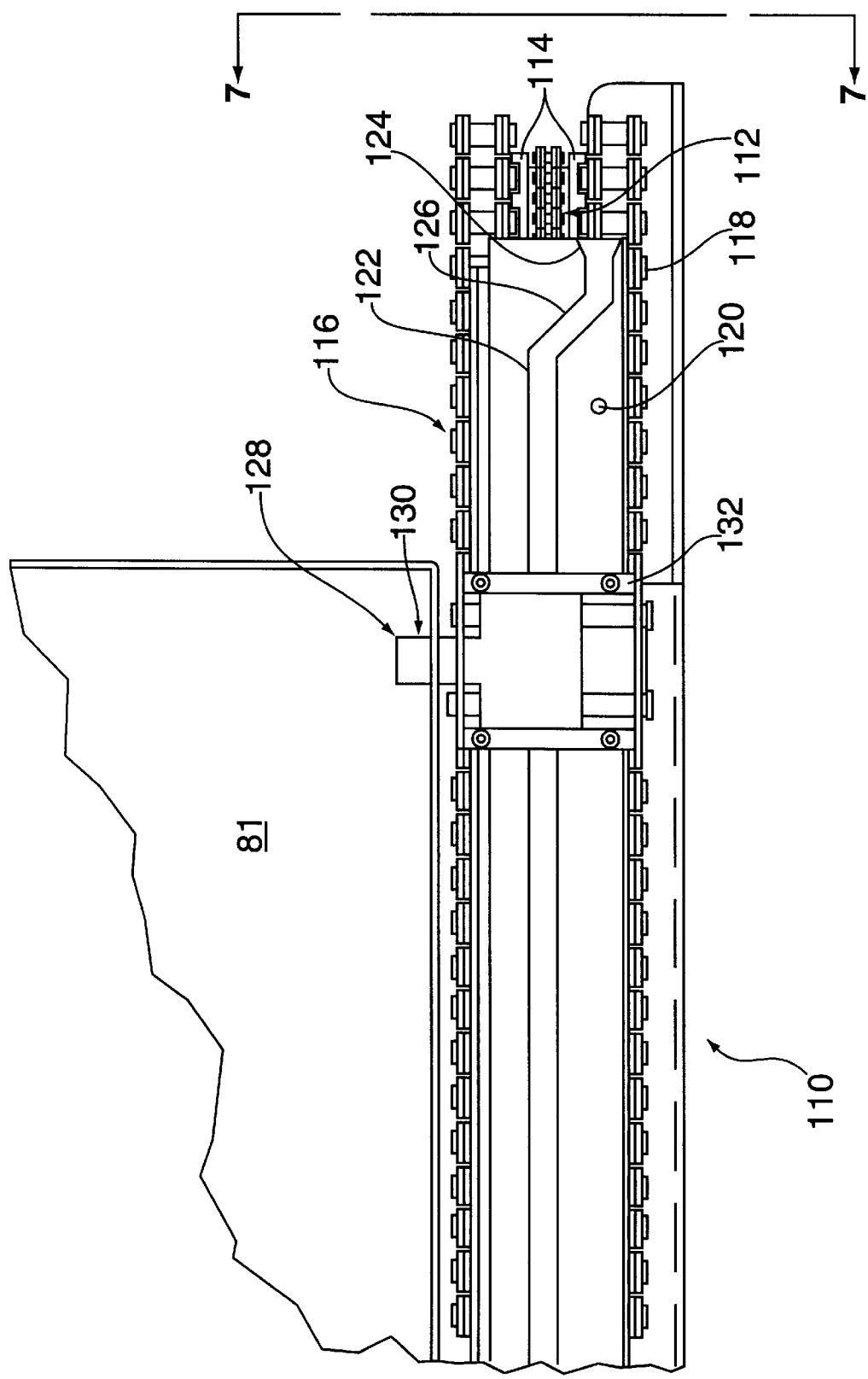
FIG. 5 is a perspective view of the major operating components of the platform-carried extraction device of the present invention, showing the insertion/extraction mechanism and cam.

Turning to FIG. 5, on either side of each tray, a tray extraction device 110 is provided. Device 110, as shown, comprises a drive chain 112 which is engaged by bi-directional motor 42 (see FIG. 1). As motor 42 is engaged, chain 112 is driven, and sprockets 114 in turn drive chains 116 and 118. Between chains 116 and 118 is positioned pin 128 which has an extended and a retracted position (extended shown in FIG. 5). In its extended position, pin 128 engages an aperture 130 in selected bin 81. It should be appreciated that bin 81 is configured to have four such apertures. One on the side opposite that shown, and two not shown, such that the bin has four apertures proximate to the four respective corners of the bin. It should be further appreciated that the instant invention can be used with only two such apertures, depending upon the application of the device, and that the apertures may be moved to other locations, merely by changing the orientation of pin 128 with respect to the chain pattern.

FIG. 5 further shows cam 120 which, in this embodiment is positioned below pin housing 132. In other embodiments (not shown but easily understood), the cam can be positioned above pin housing 132 and supported by a structured assembly, without deviating from the invention. Cam 120 is shown with three surfaces 122, 124, 126. First surface 122 is substantially linear, traversing substantially the entire length of the bin and extending a short distance beyond the length, where it meets second surface 126 which provides a cammingly-sloped direction to surface 124 which is, in turn, also substantially linear. As further shown in the subsequent figures, this cam action pulls pin 130 from its extended state (as shown) into a retracted state. In the retracted state, cam 120 can end prior to rotation about the sprockets, since, pin 130, at that point retracted, will not interfere with other bins.

It should be appreciated that the retracted state of pin 128 provides for movement of the extractor mechanism 110 and platform 28 to another location without concern that pin 128 might collide with other bins. This is a particular advantage afforded by the instant invention.

Figure 6:
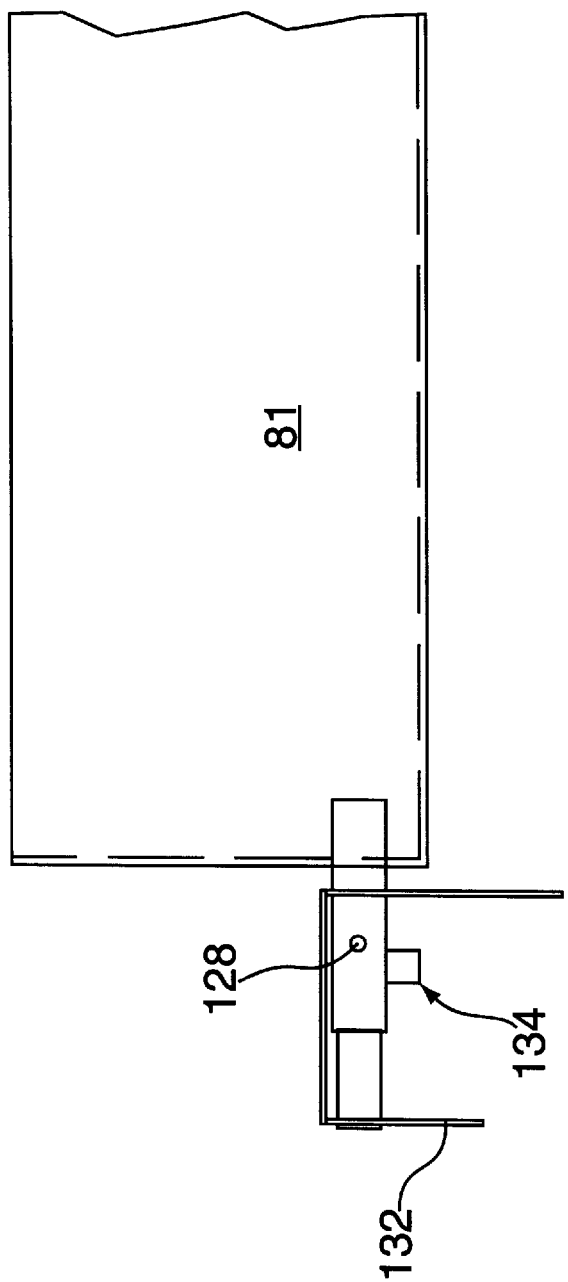
FIG. 6 is a portional, perspective view of the extraction device inserted into a bin.

FIG. 6 shows a side perspective view of pin 128 in pin housing 132, in its extended state, into bin 81. In this view, extended cam-follower 134 is shown. It should first be appreciated that where cam 120 is placed above pin 128 in this figure, cam follower 134 will be repositioned onto the top surface of pin 128. Cam-follower 134 travels against cam 120.

Figure 7:
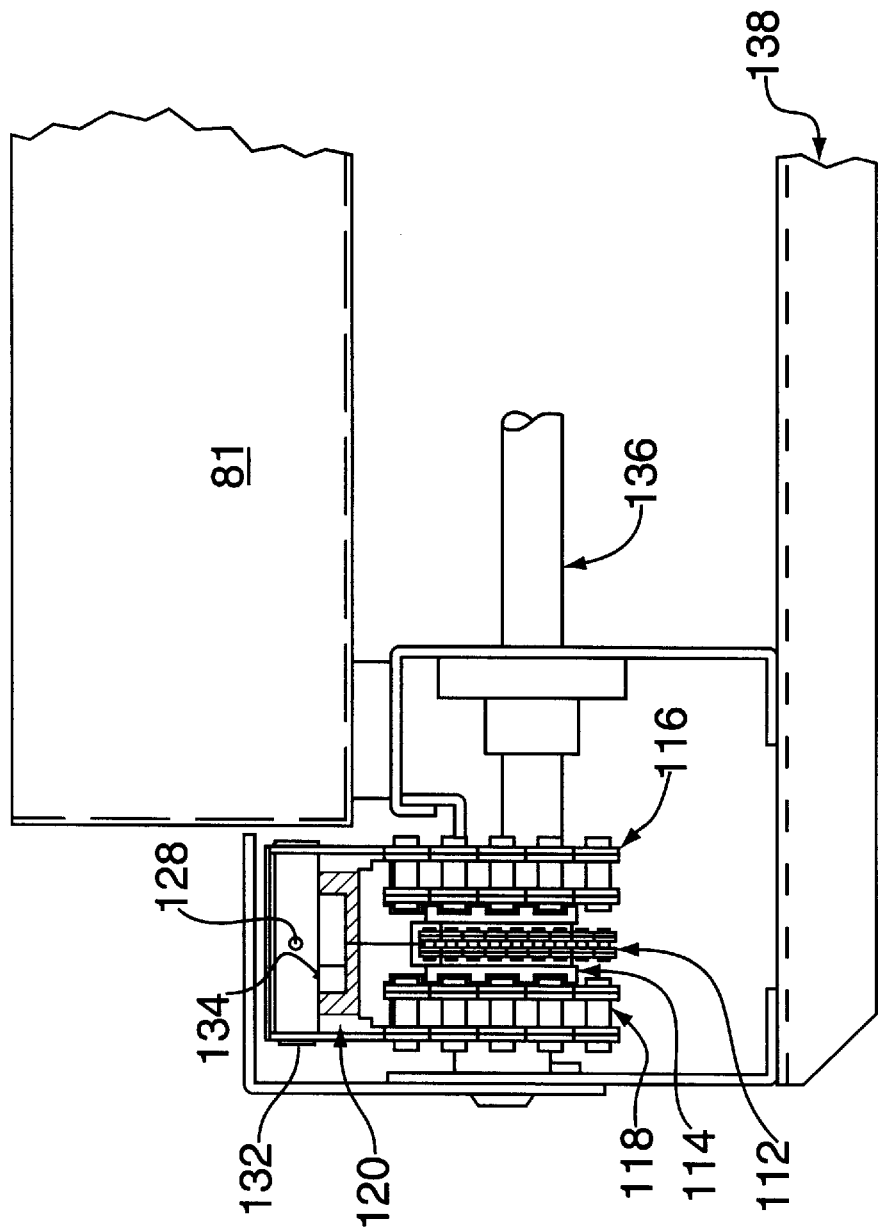
FIG. 7 is a perspective frontal view of the insertion/extraction assembly along in a direction of line A—A in FIG. 5.

In FIG. 7, the various components are shown in connection, wherein drive shaft 136 drives chain 112 which, by sprockets 114 engage chains 118 and 116 which moves pin 128 in its housing 132. The assembly is carried by platform chassis 138. Also visible is cam 120, in which cam-follower 134 can be viewed. FIG. 7 thus shows pin 128 in its retracted state, just prior to traversal about sprockets 114, and after being retracted by the cam action by traversal through cam surfaces, 122, 126 and 124 (see FIG. 5).

Figure 8:
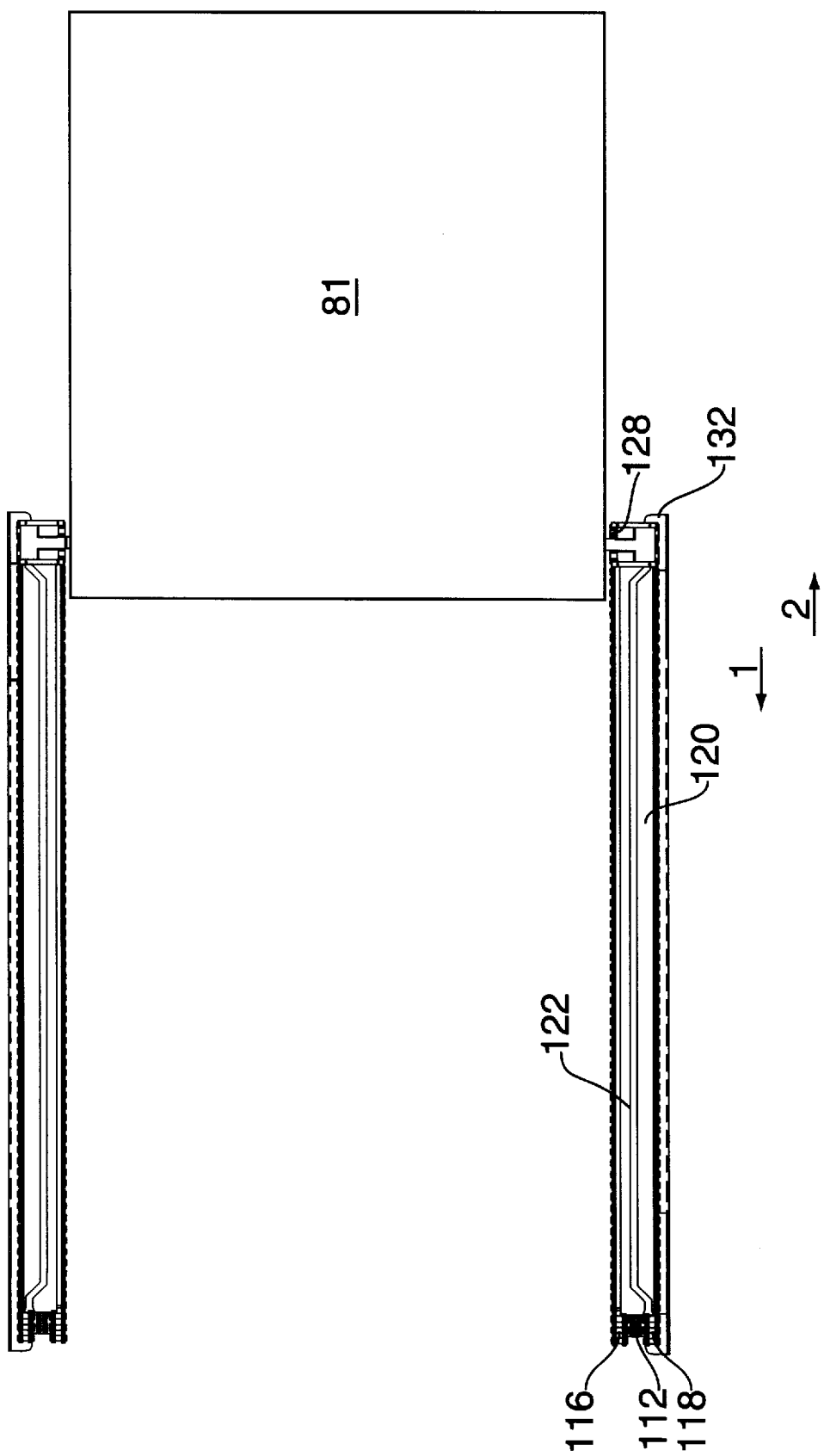
FIG. 8 is a downwardly directed view showing the extraction device in accordance with a preferred embodiment of the present invention, with the pin retracted.

In FIG. 8, a perspective of the operation of the insertion/extraction mechanism is shown. In particular, pin 128 is shown in its retracted state in housing 132, prior to moving in either the direction of arrow 1 or 2. As shown, where the device is moved in the direction of arrow 1, cam 120 will force pin 128 outwardly where it will be held in place during its entire passage along cam surface 122. In this manner, extended pin 128 will engage bin 81, and pull bin 81 in the direction of arrow 1. It should be appreciated that the preferred embodiment of the invention provides reciprocal action of the very same device on the other side of bin 81. Moreover, on the underside of the assembly, another pair of pins 128 are provided, also attached for movable action by the chains, such that as the bin is pulled upon the platform, additional pins will engage, in like fashion, the rear of the bin, thereby allowing the bin to be moved either in direction of arrow 1 or arrow 2, thereby, after receipt of the bin on the platform, providing for cross-overs of the bin from one side to the other, and thereby allowing placement of the bin in any open receptacle in the array.

Figure 9:
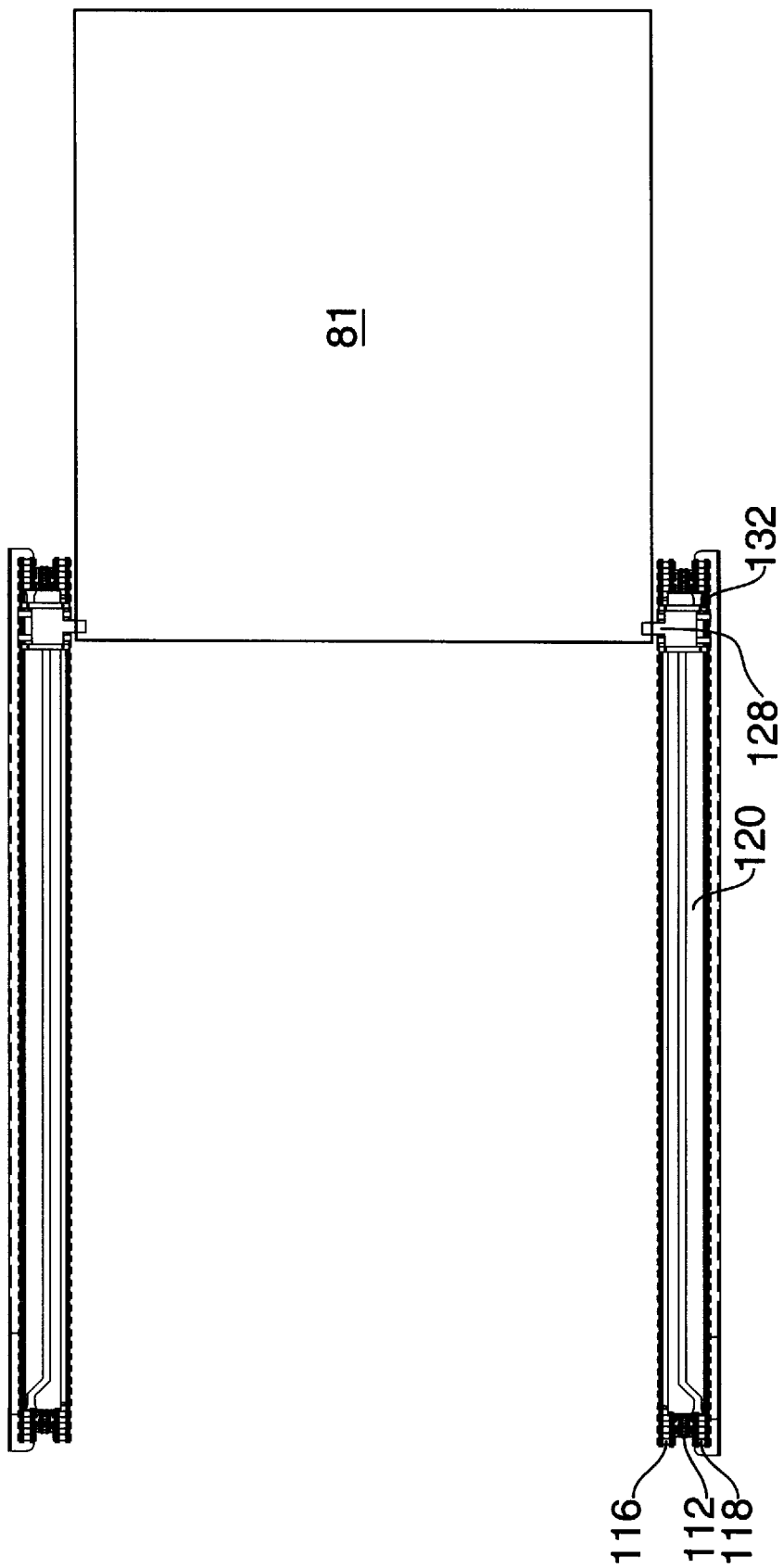
FIG. 9 is a downwardly directed view showing the extraction device in engagement.

FIG. 9 shows the result of motion along arrow 1 in FIG. 8, wherein pin 128 is now extended as a consequence of the action of cam 120, and is in forcible, moveable engagement with bin 81.

Figure 10:
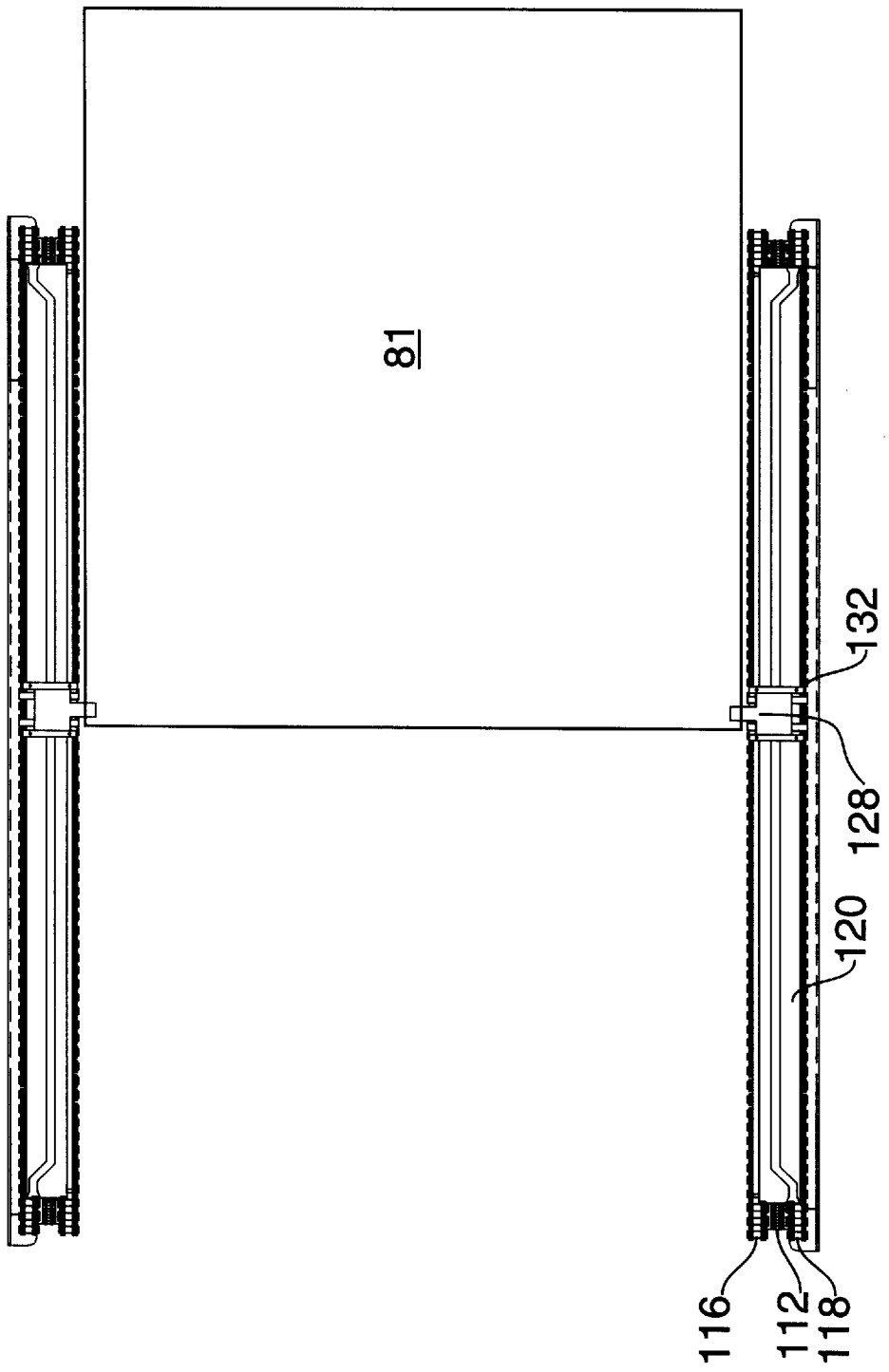
FIG. 10 is a downwardly directed view showing the extraction device in engagement, and having partly pulled a bin.

Likewise, FIG. 10 shows further motion of bin 81 further showing the tandem action of two opposing pins 128 that have engaged bin 81 at either sides of the bin, thereby accurately moving bin 81 onto the platform.

Figure 11:
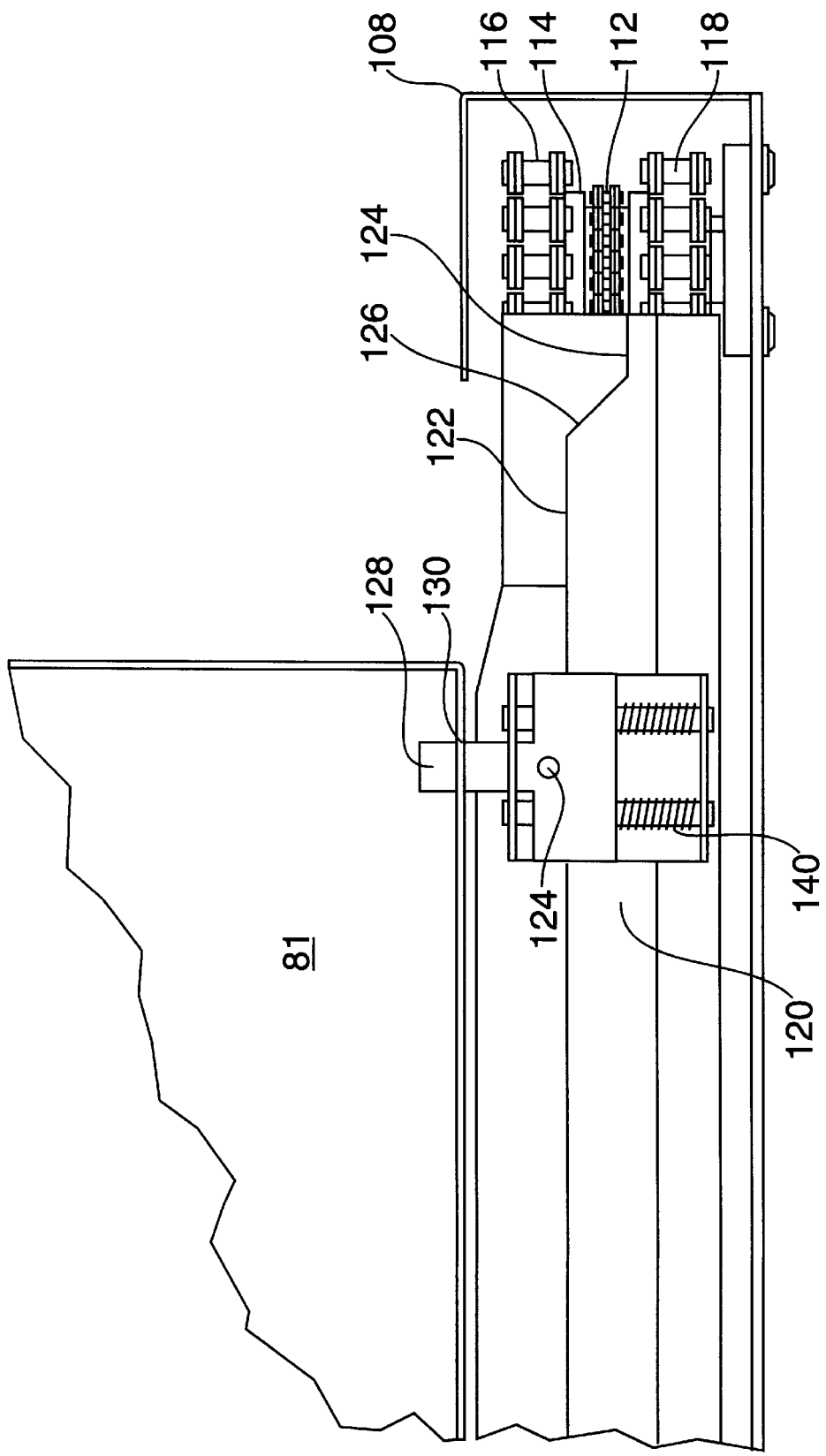
FIG. 11 is a breakaway view of an alternative embodiment of the present invention showing a spring urging the pin towards its extended state.
Figure 12:
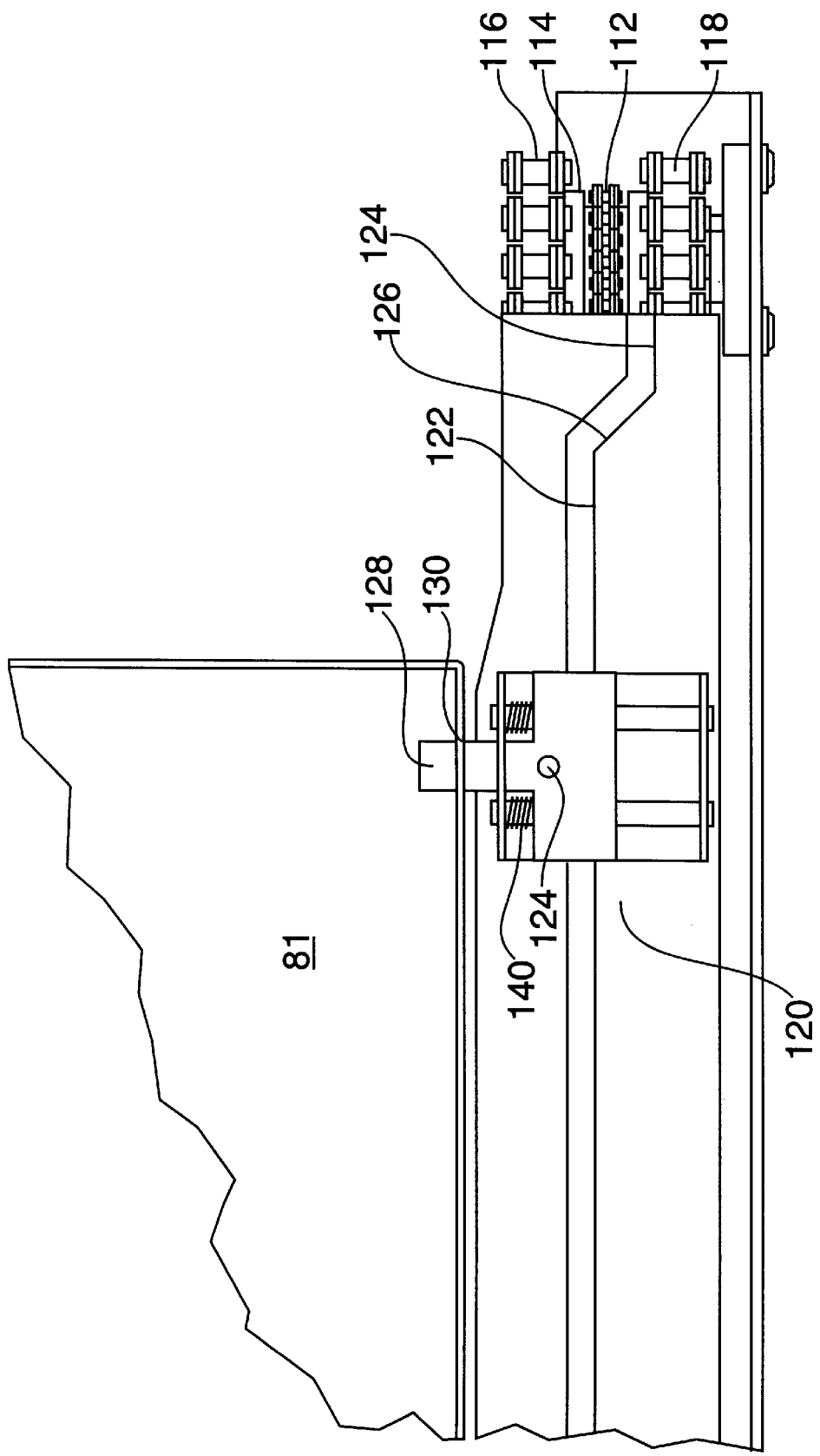
FIG. 12 is a breakaway view of an alternative embodiment of the present invention showing a spring urging the pin towards its retracted state.

FIGS. 11 and 12 show two alternative embodiments in which spring 140 is placed in two different locations to either force retraction or extension of pin 128. In FIG. 11, spring 140 forces pin 128 outwardly. In this manner, cam 120 can be reconfigured such that it merely provides surfaces 122, 126 and 124 on the one side against which spring 140 will press the cam follower 124, thereby saving material. However, since pin 128 is thereby forced into an extended state, once it traverses beyond cam surface 124, it would ordinarily seek re-extension. Hence, cowling 108 is provided to maintain pin 128 in its retracted state after traversing beyond surface 124, as the assembly passes circularly around sprockets 114.

Likewise, in FIG. 12, spring 140 forces pin 128 into its retracted state thus pressing cam follower 124 against the downwardly directed surfaces of 122, 126 and 124. After pin 128 traverses beyond surface 124, spring 140 will maintain pin 128 in its retracted state, thereby eliminating the need for cowling 108 (FIG. 11) as pin 128 traverses about sprocket 114. In certain instances this configuration can be preferred, since in an un-cammed state, spring 140 will maintain pin 128 in a retracted state an avoid any unnecessary collisions with any other surfaces or bins.

Figure 14A:
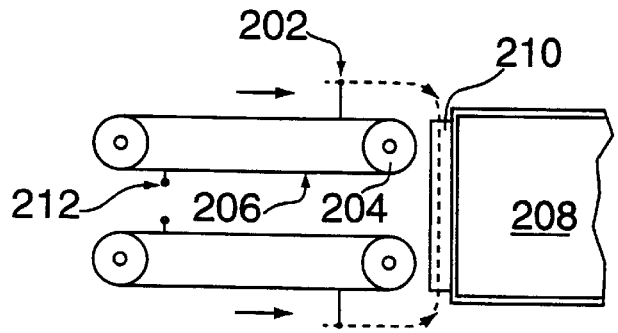
FIGS. 14 (*a*), (*b*), and (*c*) show various prior art insertion/extraction mechanisms for comparison with the basic elements of the subject invention as shown in FIGS. 14(*d*) and (*e*).
Figure 14B:
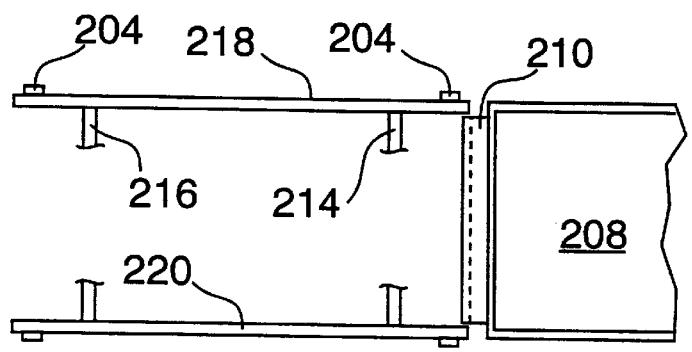
Figure 14C:
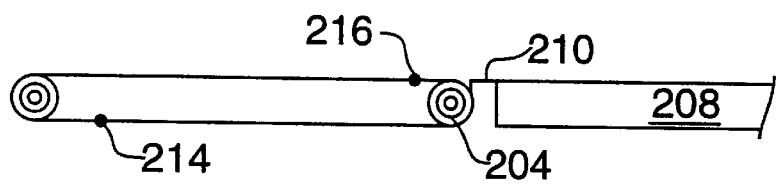
Figure 14D:
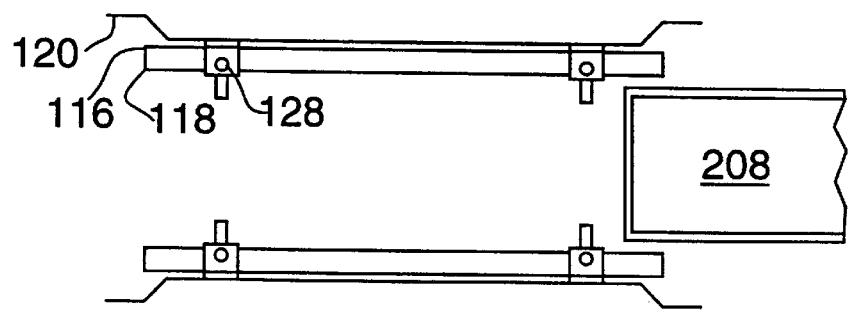
Figure 14E:
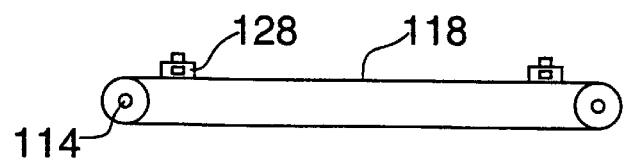

It should be appreciated that since pin 128 is generally retracted during movement of the platform and into registration with a bin location prior to extraction, the thickness of the extractor can be minimized, and thus, the distance between centers of the bins can be reduced, thereby adding greater density to the packing of the array. In this manner, more space will be saved, with all the concomitant added advantages. The overall motion of the device is shown in FIGS 14(D) and 14(E), with comparison to the prior art, in FIGS. 14(A, B and C).

Figure 13:
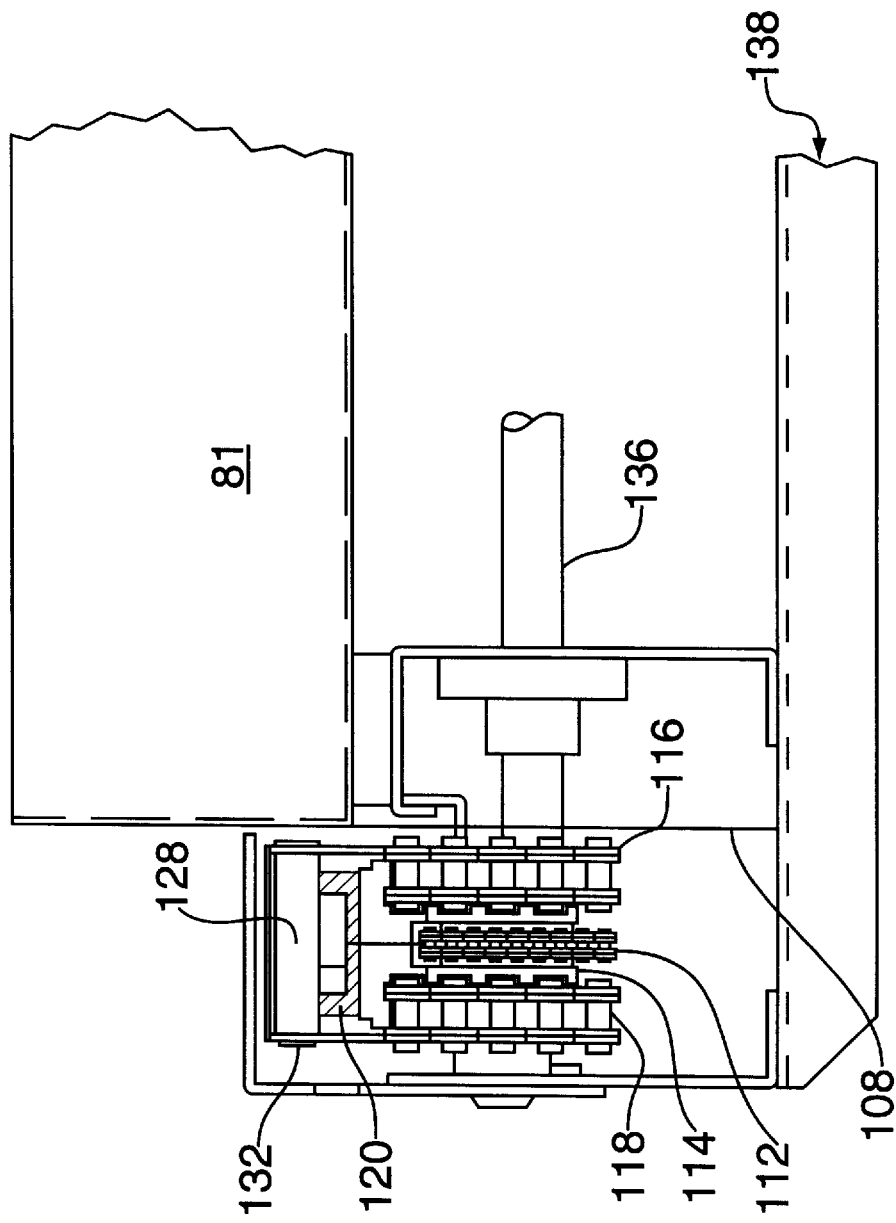
FIG. 13 is a breakaway view of an alternative embodiment of the present invention having a cowling to hold the pin in its retracted state as it traverses about the sprocket.

FIG. 13 shows the same elements as shown in FIG. 7, except the alternative embodiment shown in FIG. 13 has a cowling 108 to hold pin 128 in its retracted state as it traverses about sprockets 114.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

I claim:

1. An insertion/extraction mechanism carried on a platform for pulling bins housed in an array in an automated storage and retrieval system, the platform defining a platform plane, and each of said bins having side faces and openings on the side faces thereof, the mechanism comprising:

a pair of endless chains trained about sprockets and driven by a motor, in which said chains travel in a substantially elongated, elliptical chain pattern, said chain pattern lying in a chain plane that is perpendicular to the platform plane;

at least one extractor assembly mounted to said pair of endless chains, said extractor assembly comprising a retractable/extendable pin mounted in a housing, said retractable/extendable pin configured in a manner to provide engagement with one of the openings on a side face of one of the bins to create a bin-engaged state and a bin-disengaged state, said retractable/extendable pin further having an extended cam-follower portion;

a cam for receiving said extended cam-follower portion of said extractor assembly, such that as said endless chains travel in said chain pattern, said extractor assembly is driven along said chain pattern and said extended can-follower portion cammingly engages said cam, in a manner such that said retractable/extendable pin is caused to move linearly in a pin plane orthogonal to said chain plane between a retracted and extended position, thereby moving from said bin-engaged state in said extended position to said bin-disengaged state in said retracted position, wherein said cam comprises first, second, and third contiguously-tracked surfaces, and said first surface is linear during said bin-engaged state, said third surface is linear during said bin-disengaged state, said first and third surfaces are disposed at a distance from one another sufficient to provide disengagement of said retractable/extendable pin from an opening on the side of a bin, and said second surface traverses said distance.

2. The mechanism set forth in claim 1, wherein said extractor assembly further comprises at least one spring which urges said retractable/extendable pin towards said extended position.

3. The mechanism set forth in claim 1, wherein said extractor assembly further comprises at least one spring which urges said retractable/extendable pin towards said retracted position.

4. A storage and retrieval system comprising:

a first plurality of storage compartments successively vertically stacked along a height direction to define a first column;

a second plurality of storage compartments successively vertically stacked along said height direction to define a second column;

said first and second columns being spaced apart in opposed relation to define an access region therebetween;

at least one tray for storage in a storage compartment in either of said first or second columns, said tray having a first and second end spaced apart lengthwise along a longitudinal direction, and having opposite sides spaced apart widthwise along a width direction normal to said height and longitudinal directions, each of said sides having a pair of apertures therein defining a first pair of apertures on one side, and a second pair of apertures on the other side;

extraction means disposed in said access region for withdrawing a selected tray from its respective storage compartment in the longitudinal direction, and for inserting the selected tray in the longitudinal direction into a storage compartment in either of said first and second column and for engaging said apertures; and means for vertically displacing said extraction means along said height direction;

said extraction means comprising:

(i) platform means for supporting said selected tray after withdrawal from its respective storage compartment, said platform means having opposite ends spaced apart lengthwise along a longitudinal direction;

(ii) a first pair of extractor assemblies for engaging said first pair of apertures attached to a first pair of endless chains;

(iii) a second pair of extractor assembly for engaging said pair of apertures attached to a second pair of endless chains;

(iv) each of said extractor assemblies comprising a retractable/extendable pin mounted in a housing, said retractable/extendable pin configured in a manner to provide engagement with its respective aperture, said retractable/extendable pin further having an extended cam-follower portion, and said extractor assembly further having a cam for receiving said extended cam-follower portion of said extractor assembly to create a pin extended state and a pin retracted state;

(v) drive means for driving said endless chains for effecting movement of said extractor assemblies towards and away from said selected storage compartment, said rotation of said first and second pairs of endless chains enabling one of said first pair of said first extraction assemblies and one of said second pair of said second extraction assemblies to engage one of said first pair of apertures and one of said second pair of apertures respectively, such that each respective pins engages each respective aperture for force-transmitting engagement therewith, wherein further rotation of said first and second pairs of endless chains effects movement of said selected tray longitudinally in a first direction away from its respective storage compartment and onto said platform means, said further rotation effecting concurrent movement of said second of said first pair of extraction assemblies and said second of said second pair of extraction assemblies longitudinally in a second direction towards said respective storage compartment until said tray is substantially withdrawn from said storage compartment, whereupon continued rotation of said first and second pairs of endless chains enables said second of said first pair of extraction assemblies and said second of said second pair of extraction assemblies to engage respective apertures of said other end of said tray, said drive means effecting further rotation of said pairs of endless chains for moving said selected tray in said first direction fully onto said platform means; and further wherein when said selected tray is disposed on said platform means, additional rotation of said pairs of endless chains enables further movement of said selected tray into registered insertion in any one of the storage compartments selectively located in either of said columns, further such that as said endless chains travel and said extractor assemblies are driven, said extended cam-follower portions of each of said extractor assemblies cammingly engages each of said cams, in a manner such that said retractable/extendable pins are caused to move linearly and orthogonal to the direction of motion of said chains.

5. The system set forth in claim 4, wherein each of said cams comprises first, second, and third continguously-tracked surfaces, and said first surface is linear during said bin-engaged state, said third surface is linear during said bin-disengaged state, said first and third surfaces are disposed at a distance from one another sufficient to provide disengagement of said retractable/extendable pin from an opening on the side of a bin, and said second surface traverses said distance.

6. The system set forth in claim 4, wherein each of said extractor assemblies further comprises at least one spring which urges its respective retractable/extendable pin towards an extended position.

7. The system set forth in claim 4, wherein each of said extractor assemblies further comprises at least one spring which urges its respective retractable/extendable pin towards a retracted position.

8. The system set forth in claim 4, wherein said drive means further includes means for effecting bi-directional rotation of said endless chains.

9. The system set forth in claim 4, wherein said means for vertically displacing said extraction means includes means for sensing proper registration of said platform means with a selected one of said storage compartments in said first or second columns to thereby enable withdrawal of a tray from and insertion of a tray into the selected storage compartment.

10. The system set forth in claim 4, wherein said second extraction means enables insertion of said selected tray into a storage compartment located in the column opposing the column in which said selected tray was originally located.

11. The system set forth in claim 4, wherein said first and second columns comprise a first portion, additional third and fourth columns comprise a second portion, said additional third and fourth columns define a second access region therebetween, at least one tray is disposed in said second portion, an extraction means is vertically displaced in said second access region, said extraction means includes a second platform means, each of said first and second platform means are positioned to move upwardly and downwardly within said respective first and second access region, and wherein said upward and downward movement is controlled by a cable means that provides for tandem movement of said first and second platform means.

12. The automated storage and retrieval system according to claim 11, wherein said cable means comprises a cable that is positioned in a cable run, and said cable run helically coils about a drum such that the coils do not tangle.

\* \* \* \* \*